Dec. 30, 1969    S. R. TYLER    3,486,458
CENTRIFUGAL PUMPING APPARATUS
Filed Jan. 5, 1968
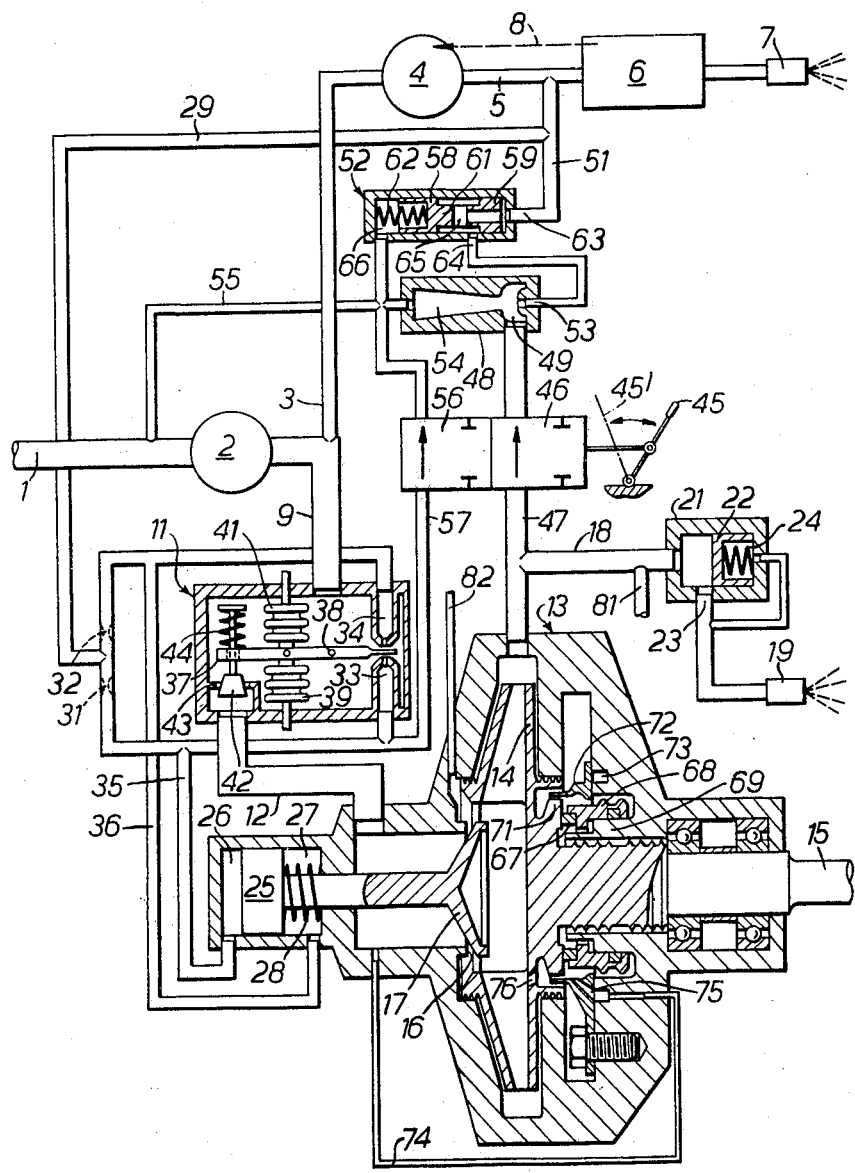

United States Patent Office 3,486,458
Patented Dec. 30, 1969

3,486,458
CENTRIFUGAL PUMPING APPARATUS
Stanley R. Tyler, Cheltenham, England, assignor to Dowty Fuel Systems Limited, Cheltenham, England, a British company
Filed Jan. 5, 1968, Ser. No. 695,974
Claims priority, application Great Britain, Jan. 6, 1967, 977/67
Int. Cl. F04d 15/00; F02c 9/04
U.S. Cl. 103—97                                6 Claims

ABSTRACT OF THE DISCLOSURE

In an aircraft gas turbine engine having a continuously driven centrifugal pump for supplying liquid fuel to supplementary burners, the supply of liquid fuel can be stopped by closing an inlet valve which is disposed between the fuel source and the centrifugal pump, while the liquid fuel within the pump is vented by connecting the delivery side of the pump to the induction chamber of an ejector pump, the latter pump having an inlet nozzle connected to an independent source of liquid fuel under pressure and a diffuser passage connected to a low pressure region of the fuel supply system.

BACKGROUND OF THE INVENTION

Field of the invention

Fuel supply systems for supplementary burners, such as reheat burners, associated with a gas turbine engine.

Description of the prior art

A liquid fuel supply system for gas turbine engines is described in U.S. application No. 586,450, filed Oct. 13, 1966 now Patent No. 3,391,541, comprising a centrifugal pump having a valve at its inlet which is controlled by flow control means to vary the flow of fuel from a source, and through the pump to a delivery conduit. The system includes a control member which operates the flow control means, and which, in conjunction with a feedback link responsive to engine discharge nozzle area, operates a shut-down valve. The shut-down valve is movable to one position in which the inlet valve of the centrifugal pump is closed and the delivery side of the centrifugal pump is connected to a low pressure region of the system, for example the inlet side of a boost pump.

In the shut-down condition the centrifugal pump, operating with a vapour core within an annular body of liquid in the radially outer portion of the pump chamber, develops a pressure which is substantially equal to the difference between the pressure at the inlet of the boost pump and the vapour pressure of the liquid within the core.

The present invention has for one object to reduce the pressure difference developed by the centrifugal pump in the shut-down condition, whereby temperature rise in the pump is correspondingly reduced.

Another object of the invention is to provide local cooling within the pump during shut-down by means of a cooling flow of liquid over the main seal of the pump.

SUMMARY OF THE INVENTION

Pumping apparatus for the supply of liquid fuel to burners supplementary to the main burners of an aircraft gas turbine engine, comprises a centrifugal pump having an impeller rotatable in a pump casing, flow control means arranged to regulate flow of liquid fuel through the pump from a source to the supplementary burners, an inlet valve interposed between the source of liquid fuel and the eye of the impeller, the inlet valve being substantially closed by the flow control means upon cessation of fuel flow to the supplementary burners, an ejector pump including an inlet nozzle connectable to a source of liquid under pressure, an induction chamber having a connectio to the delivery side of the centrifugal pump, and an outlet diffuser passage connected to a low pressure region of the apparatus, and a shut-down valve in the connection between the delivery side of the centrifugal pump and the induction chamber, adapted on cessation of fuel flow to the supplementary burners to place the delivery side of the centrifugal pump substantially at the pressure of the induction chamber, whereby fuel is ejected from the centrifugal pump to the low pressure region.

BRIEF DESCRIPTION OF THE DRAWING

One embodiment of the invention is illustrated in the accompanying diagrammatic drawing as a fuel supply system for a gas turbine engine having main and reheat fuel burners.

DESCRIPTION OF THE PREFERRED EMBODIMENT

A fuel supply pipe 1 leads from a source to a boost pump 2. The delivery of the boost pump is divided, one pipe 3 leading to a main engine pump 4, the delivery from which flows through a pipe 5 to a flow control unit 6 for a set of main burners 7. The pump 4 may be a variable delivery pump, the delivery of which is regulated by a control connection 8, shown diagrammatically, extending from the flow control unit 6.

Another pipe 9 from the boost pump 2 leads to a reheat flow control unit 11 from which a pipe 12 leads to the inlet of a centrifugal pump having a casing 13. This pump has an impeller 14 driven by a shaft 15, and an inlet valve adjacent the eye of the impeller provided by a fixed seat 16 and an axially movable valve member 17. A delivery pipe 18 from the pump 13 leads to a set of reheat burners 19 by way of a pressure-maintaining valve 21 which comprises a pressure-operated piston 22 normally closing an outlet port 23 under the load of a spring 24.

The valve member 17 of the centrifugal pump 13 is movable by a piston 25 under the control of fluid pressure in chambers 26, 27 on opposite sides of the piston 25, and under the control of a spring 28 in the chamber 27 which acts on the piston in the valve-closing direction.

A supply of fuel under pressure in a pipe 29 from the main pump delivery pipe 5, is branched through fixed restrictors 31, 32 to nozzles 33, 34 respectively which are arranged in opposition in the flow control unit. Pipes 35, 36 supply the pressures at the nozzles 33, 34 to the respective chambers 26, 27. These pressures are varied by a lever 37 which is pivoted at 38 and which extends between the nozzles. Capsules 39, 41 acting on opposite sides of the lever 37 are supplied with pressure control signals one of which is varied in known manner by a manual reheat selector, not shown. The unit 11 includes a flow meter comprising a tapered plug 42 and an orifice 43. The tapered plug 42 acts through a spring 44 on the lever 37 with a force which increases with flow and which constitutes a negative feedback signal of actual flow. The lever 37 co-operates with the nozzles 33, 34 to vary the pressures in the respective chambers 26, 27 whereby the restriction to fuel flow provided by the inlet valve 16, 17 varies in the sense required to equate the actual flow to the selected flow. The fuel entering the eye of the impeller 14 forms an annulus of liquid in the chamber formed by the outer part of the impeller and pump casing, the radial depth of which is self-adjusting to match the load of the pressure-maintaining valve 21 and the reheat burners 19.

The system thus far described is generally known. The present invention is particularly concerned with the manner in which the system operates when reheat is shut down. A shut-down valve is provided which is operable by a lever 45. The shut-down valve includes one section 46 which is operable to open and to close a pipe connection 47 between the delivery of the centrifugal pump 13 and the suction chamber 49 of an ejector pump 48. A pipe 51 branching from the main pump delivery pipe 5 is connected through an ejector shut-off valve 52 to the nozzle 53 of the ejector pump. The diffuser 54 of the ejector pump is connected by a return pipe 55 to the fuel supply pipe 1 which forms a low pressure region for vented fuel.

Another section 56 of the shut-down valve is operable to open and close a pipe connection 57 between the servo pressure supply pipe 35 to the chamber 26, and the low pressure return pipe 55.

The ejector shut-off valve 52 comprises a piston member having two axially spaced pistons 58, 59 connected by a stem 61, and a spring 62 urging the piston member to a position in which the piston 59 uncovers an outlet port 64. A passage 65 in the piston 59 and stem 61 connects an inlet port 63 for pressure from the pipe 5 to the space around the stem 61. The spring chamber 66 at one end of the piston 58 is vented to the low pressure pipe 55. At low flow rates to the main burners 7, the spring 62 overcomes the fluid pressure in the pipe 5 and maintains the valve 52 in the open position as shown so that fuel flows from the ejector pump nozzle 53 to the diffuser 54 and the low pressure return pipe 55. When fuel flow to the burners 7 increases, the piston 59 starts to close the outlet port 64 at a first predetermined pressure in the pipe 5 and it fully closes the port 64 at a second predetermined pressure. The purpose of this valve 52 will be described in connection with the manner of operation of the system.

A further feature of the centrifugal pump which affects the manner of operation at shut-down will now be described. The impeller 14 has a main seal comprising a carbon ring seal 67 which is carried by a sleeve 68 having slidable sealing engagement with a cylindrical bearing member 69 in the pump casing. The sealing ring engages a face plate 71 which is fixed to the impeller 14. A shroud ring 72 fixed in the pump casing has a working clearance with the periphery of the face plate 71. The shroud ring 72, moreover, encloses a channel 73 in the pump casing which is suppiled by a pipe 74 with liquid fuel from the pump inlet upstream of the inlet valve 16, 17. A number of jet orifices 75, one of which is seen, are disposed in the shroud ring 72 to direct jets of cooling liquid on to the sealing ring 67. The pressure of liquid discharged by the jets also acts on the end face of the sleeve 68 to exert a load supplemented by springs, not shown, between the sealing ring 67 and the face plate 71. As a result of providing the cooling and lubricating jets, there is a steady flow of liquid through the working clearance between the shroud ring 72 and the face plate 71, and this is returned to the interior of the impeller 14 through a number of openings 76 in the back plate of the impeller adjacent the eye of the impeller.

A branch pipe 81 may be provided from the delivery pipe 18, and another branch 82 from the pump inlet pipe 12, these branches forming a fluid power source for an auxiliary power-consuming service.

During operation of the system when reheat is selected, the lever 45 being in the position 45′, the valve section 46 isolates pump delivery from the suction chamber 49, and the valve section 56 isolates the servo pressure pipe connection 57 from the low pressure return pipe 55. The flow of cooling fuel through the jets 75 rejoins the main stream of fuel through the inlet valve, 16, 17 and is discharged to the reheat burners 19.

Upon shut-down of reheat, the lever 45 being in the position shown, the valve section 56 connects the servo pressure pipe connection 57 to the low pressure return pipe 55, whereby there is low pressure in the chamber 26. The piston 25 then moves under the pressure in chamber 27 and the load of spring 28 to close the inlet valve 16, 17. The cooling liquid from the jets 75 continues to enter the impeller 14 by way of the openings 76 and is discharged through the pipe 47 and the section of the shut down valve, now open, to the suction chamber 49 of the ejector pump 48. The fall of pressure in the pipe 47, allows the pressure-maintaining valve 21 to be closed by its spring 24. Liquid fuel is discharged through the diffuser 54 and the return pipe to the inlet side of the boost pump 2 where it mixes with the relatively cool fuel, the larger part of which flows through the pipe 3, the main pump 4, and the control unit 6 to the main buners 7.

Under conditions of low fuel flow to the main burners 7, for instance when the aircraft is cruising at high altitude with the reheat shut-down, the shut-off valve 52 is open, whereby the flow of fuel through the nozzle 53 of the ejector pump causes a reduction of pressure in the pipe 47 and within the periphery of the centrifugal pump casing. The reduction of pressure head within the centrifugal pump, reduces the generation of heat in the fuel discharged from the pump, and therefore limits the temperature rise of the fuel flowing through the boost pump 2 and the main engine pump 4.

If fuel flow to the main burners 7 increases, the proportion of recirculated fuel flowing through the low pressure pipe 55 to the supply pipe 1 decreases in relation to the flow to the main burners. As the pressure in the pipe 5 increases from the first to the second of the predetermined pressures, the outlet port 64 is progressively closed, thus reducing the velocity of the jet through the ejector pump nozzle 53. When the jet velocity ceases, the pressure in the suction chamber increases so that the centrifugal pump 13 develops the pressure head necessary to discharge the flow of cooling fuel against the resistance of the fluid flow path to the fuel supply pipe 1. The resulting temperature rise in the cooling fuel can be tolerated because it is absorbed by a considerably increased flow of fuel to the main burners 7. Under high flow conditions, the isolation of the ejector pump nozzle 63 by the shut-off valve 52 will not diminish the maximum delivery of which the main engine pump 4 is capable.

It is not essential that the inlet valve 16, 17 shall close completely on reheat shut-down as a minimum flow may occur which supplements or replaces the cooling flow.

What is claimed is:

1. Pumping apparatus for the supply of liquid fuel to burners supplementary to the main burners of an aircraft gas turbine engine comprising:
 (A) a centrifugal pump having an impeller (14) rotatable in a pump casing (13),
 (B) flow control means (11) arranged to regulate flow of liquid fuel through the pump from a source (1) to the supplementary burners (19),
 (C) an inlet valve (16, 17) interposed between the source (1) of liquid fuel and the eye of the impeller (14), the inlet valve being substantially closed by the flow control means upon cessation of fuel flow to the supplementary burners,
 (D) an ejector pump including
  (1) an inlet nozzle (53) connectable to a source (4) of liquid under pressure,
  (2) an induction chamber (49) having a connection (47) to the delivery side of the centrifugal pump, and
  (3) an outlet diffuser passage (54) connected to a low pressure region (1) of the apparatus, and
 (E) a shut down valve (46) in the connection (47) between the delivery side of the centrifugal pump and the induction chamber (49), adapted on cessation of fuel flow to the supplementary burners to place the delivery side of the centrifugal pump substantially at the pressure of the induction chamber, whereby fuel is ejected from the centrifugal pump to the low pressure region (1).

2. Pumping apparatus according to claim 1, wherein the inlet valve (16, 17) is operable by said flow control means (11) to regulate the delivery of liquid fuel from the centrifugal pump.

3. Pumping apparatus according to claim 1, wherein the centrifugal pump includes orifice means (75) directed towards a main seal (67) which is provided between the pump impeller (14) and the pump casing (13), and passage means (74, 76) arranged to supply said orifice means with a cooling flow of liquid from the source (1), and to convey liquid discharged from the orifice means towards the eye of the impeller.

4. Pumping apparatus according to claim 1, wherein the shut down valve (46) includes means (56) operatively connected to the flow control means (11) to cause cessation of fuel flow when the shut down valve is operated to place the delivery side of the centrifugal pump substantially at the pressure of the induction chamber (49).

5. Pumping apparatus according to claim 1, wherein the source (4) of liquid under pressure is a main pump which supplies liquid fuel from the source (1) to main burners (7) of the engine, the delivery side of the main pump (4) having a connection (51) to the inlet nozzle (53), in which connection there is interposed a pressure-responsive valve (52), said valve being responsive to the delivery pressure of the main pump so as to close at main pump pressures above a predetermined value, and to open at pressures below said predetermined value and admit fluid pressure to the inlet nozzle (53), whereby the ejector pump is operable to eject fuel from the centrifugal pump when the shutdown valve (46) is opened.

6. Pumping apparatus for the supply of liquid fuel to burners supplementary to the main burners of an aircraft gas turbine engine comprising
 (A) a centrifugal pump having an impeller (14) rotatable in a pump casing (13),
 (B) flow control means (11) arranged to regulate flow of liquid fuel through the pump from a source (1) to the supplementary burners (19),
 (C) an inlet valve (16, 17) interposed between the source (1) of liquid fuel and the eye of the impeller (14), the inlet valve being substantially closed by the flow control means upon shut down of fuel flow to the supplementary burners,
 (D) orifice means (75) in the centrifugal pump supplied with liquid from the source (1) and arranged to direct a cooling flow of liquid over the main seal (67) of the pump and towards the eye of the pump impeller (14), and
 (E) an ejector pump including
  (1) an inlet nozzle (53) connectable to a source (4) of liquid under pressure,
  (2) an outlet diffuser passage (54) connected to a low pressure region (1) of the apparatus, and
  (3) an induction chamber (49) having a connection (47) to the delivery side of the centrifugal pump adapted upon shut down of fuel flow to the supplementary burners to place the delivery side of the centrifugal substantially at the pressure of the induction chamber, whereby liquid fuel entering the pump through the orifice means (75) after shut-down is ejected from the centrifugal pump to the low pressure region (1).

References Cited

UNITED STATES PATENTS

| | | | |
|---|---|---|---|
| 3,084,510 | 4/1963 | Marscher. | |
| 3,309,995 | 3/1967 | Tyler | 103—11 |
| 3,316,712 | 5/1967 | Tyler | 60—39.28 |
| 3,391,541 | 7/1968 | Tyler | 60—235 |
| 3,408,943 | 11/1968 | Rimmer | 103—97 |

LEONARD H. GERIN, Primary Examiner

U.S. Cl. X.R.

60—39.28, 235; 230—114; 431—89, 281